United States Patent [19]

Saito et al.

[11] 4,212,693
[45] Jul. 15, 1980

[54] FISHING ROD AND PROCESS FOR ITS PRODUCTION

[75] Inventors: Koukichi Saito, Asaka; Nobuo Suzuki, Okegawa, both of Japan

[73] Assignee: Dainippon Ink and Chemicals, Inc., Tokyo, Japan

[21] Appl. No.: 873,533

[22] Filed: Jan. 30, 1978

[30] Foreign Application Priority Data

Feb. 3, 1977 [JP] Japan ................................ 52-10232

[51] Int. Cl.² ...................... B65H 81/00; B31C 13/00; B65H 81/03
[52] U.S. Cl. .................................. 156/173; 156/186; 428/36; 428/377; 273/DIG. 7
[58] Field of Search ................ 428/32, 36, 37, 187, 428/188, 377, 384, 391; 43/186 F; 242/7.01, 7.02, 7.04; 156/173, 186, 188; 273/80 R, DIG. 7

[56] References Cited

U.S. PATENT DOCUMENTS

| | | | |
|---|---|---|---|
| 2,726,185 | 12/1955 | Howald | 428/377 X |
| 2,749,643 | 6/1956 | Scott | 428/36 X |
| 3,137,601 | 6/1964 | Menzer | 428/195 X |
| 3,374,807 | 9/1978 | Michael | 428/36 X |
| 3,389,046 | 6/1968 | Burress | 273/DIG. 7 |
| 3,896,858 | 7/1975 | Whatley | 428/188 X |
| 3,953,637 | 4/1976 | Phillips | 273/80 R |
| 3,969,557 | 7/1976 | Jenks | 428/377 X |
| 4,015,360 | 4/1977 | Herter | 273/DIG. 7 |
| 4,061,806 | 12/1977 | Lindler et al. | 428/377 X |
| 4,062,711 | 12/1979 | Davis | 428/285 X |

FOREIGN PATENT DOCUMENTS

50-19476 8/1972 Japan .
1349906 4/1974 United Kingdom .............. 273/DIG. 7

*Primary Examiner*—George F. Lesmes
*Assistant Examiner*—Daniel R. Zirker
*Attorney, Agent, or Firm*—Wenderoth, Lind & Ponack

[57] ABSTRACT

A method for producing a fishing rod made of a glass fiber-reinforced synthetic resin which comprises impregnating a glass cloth with a thermosetting synthetic resin to form a prepreg, wrapping the prepreg about a tapered mandrel, curing it under heat, and then pulling out the mandrel, wherein the glass cloth has letters, geometrical figures or other decorative designs applied to the whole or a part of its surface by printing or coating, and the thermosetting synthetic resin is the one which can give a transparent cured product.

2 Claims, 6 Drawing Figures

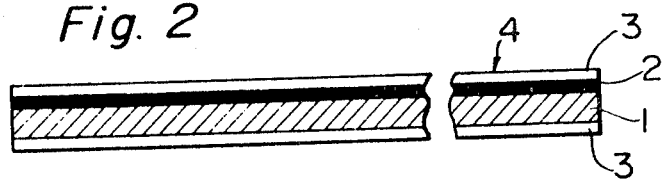
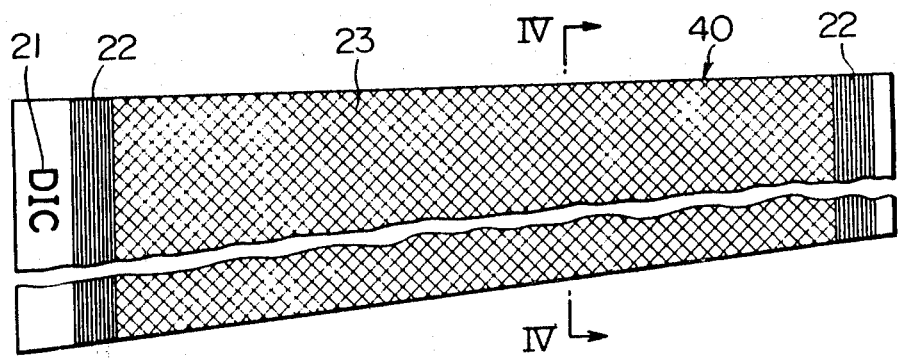
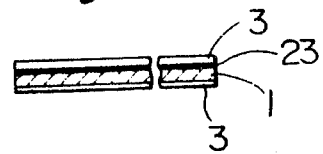

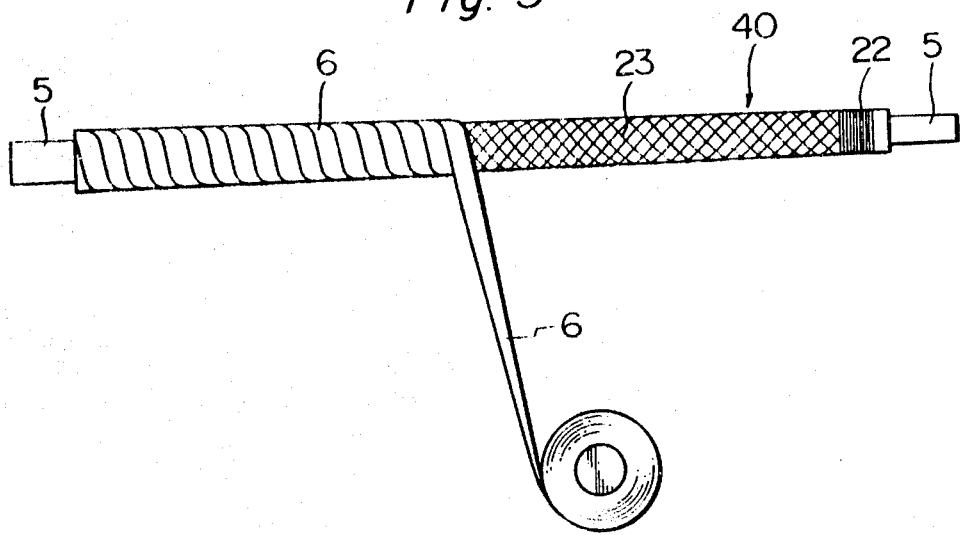
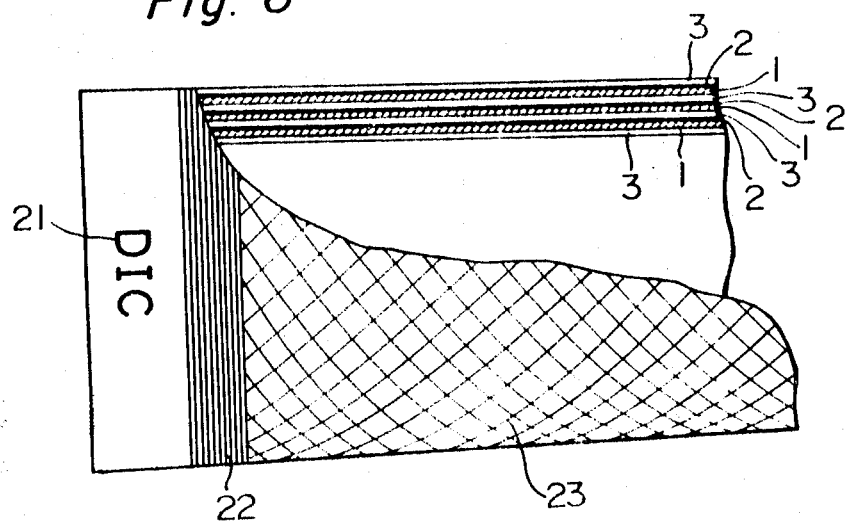

FISHING ROD AND PROCESS FOR ITS PRODUCTION

This invention relates to a fishing rod made of a glass fiber-reinforced synthetic resin, and to a process for its production.

Fishing rods made of glass fiber-reinforced synthetic resins have come into widespread use in place of rods made of natural materials because they are lighter in weight and have superior strength and moderate rigidity. Generally, fishing rods of this kind have letters or geometrical figures, such as trademarks, printed on their peripheral surfaces, and particularly, jointed-type fishing rods have spiral or other decorative designs printed or coated on their surfaces.

In practice, however, it is very troublesome to apply printing or coating to the outer curved surfaces of fishing rods, and the operability of such a process is considerably low. This inevitably leads to a high cost of fishing rods with decorative designs which are produced by such a method.

As an attempt to produce fishing rods with decorative designs simply and efficiently, Japanese Patent Publication No. 19476/75 discloses a method which comprises applying a film of letters, geometrical figures, or other decorative designs by coating or printing to the surface of a prepreg resulting from the impregnation of a glass cloth with a synthetic resin, and then molding it by wrapping it about a tapered mandrel. Since the impregnated resin in the prepreg is in the uncured or half-cured state and is tacky, it is very difficult in practice to perform printing or coating on the surface of such a prepreg. This method also has the defect that when printing or coating is applied to the surface of a prepreg in such a manner, the resulting layer is susceptible to separation between layers. Another defect is that when such a prepreg having a film applied to its surface by printing or coating is heat-cured around a tapered mandrel for molding, the film tends to be deformed by the melting and flowing of the impregnated resin, and therefore, the desired letters, geometrical figures or decorative designs sometimes cannot be obtained.

It is an object of this invention therefore to provide a method which can afford a fishing rod having letters, geometrical figures or other decorative designs simply, efficiently and at a low cost without involving the aforesaid defects.

According to this invention, there is provided, as a novel method capable of achieving the above object, a method for producing a fishing rod made of a glass fiber-reinforced synthetic resin which comprises impregnating a glass cloth with a thermosetting synthetic resin to form a prepreg, wrapping the prepreg about a tapered mandrel, curing it under heat, and then pulling out the mandrel, wherein the glass cloth has letters, geometrical figures or other decorative designs applied to the whole or a part of its surface by printing or coating, and the thermosetting synthetic resin is the one which can give a transparent cured product.

The method of this invention is described specifically by reference to the accompanying drawings in which:

FIG. 1 is a sectional view of a glass cloth having its surface printed or coated;

FIG. 2 is a sectional view of a prepreg formed by impregnating the glass cloth shown in FIG. 1 with a thermosetting synthetic resin;

FIG. 3 is a top plan of a prepreg which has been cut into a trapezoidal shape prior to wrapping around a tapered mandrel for molding;

FIG. 4 is a sectional view taken along the line IV—IV of FIG. 3;

FIG. 5 is a side elevation for illustrating the operation of forming a fishing rod on a tapered mandrel; and FIG. 6 is a partial, sectional side elevation of a fishing rod produced by the method of this invention.

As is well known, fishing rods made of glass fiber-reinforced synthetic resins are produced usually by impregnating a glass cloth with a thermosetting synthetic resin, wrapping the resulting prepreg about a tapered mandrel, curing it under heat, and pulling out the mandrel. The method of this invention is performed in accordance with such a known technique except using a prepreg which is obtained by impregnating a glass cloth having the desired printing or coating applied thereto with a thermosetting synthetic resin capable of giving a transparent cured product.

According to the method of this invention, a film 2 of the desired letters, geometrical figures or decorative design is formed by printing or coating on the surface of a glass cloth 1, as shown in FIG. 1. Then, as shown in FIG. 2, a thermosetting synthetic resin 3 which will afford a transparent cured product by heat curing, such as a polyester resin, is impregnated in the glass cloth to form an uncured or half-cured prepreg 4. Of course, the film 2 bearing the letters, figures or decorative designs on the glass cloth 1 should not be soluble in the synthetic resin 3. The film 2 can be formed by using a curable printing ink or paint such as a metal chelate crosslinking type or an isocyanate crosslinking type.

The prepreg 4 is generally a large sheet-like material. It is cut into prepreg sheets of a suitable size and shape conforming to the size and taper of the mandrel, for example a prepreg sheet 40 having a trapezoidal shape as shown in FIG. 3. In FIG. 3, the reference numerals 21, 22 and 23 show some embodiments of the film 2 printed or coated on the surface of the glass cloth 1. The numeral 21 shows a lettered trademark; 22, a spiral design; and 23, a lattice design. The prepreg sheet 40, as can be seen from FIG. 4, has the same cross-sectional structure as the prepreg 4 shown in FIG. 2.

The prepreg 40 is then wrapped through a plurality of turns about a tapered mandrel 5 as shown in FIG. 5, and for the purpose of clamping, an adhesive tape 6 is wound spirally around its peripheral surface.

The assembly obtained is placed in a heating oven where the prepreg sheet 40 wrapped about the mandrel 5 is cured. Then, the mandrel 5 is pulled out.

Finally, the adhesive tape 6 is removed from the molded product, and the peripheral surface of the molded product is smoothed by polishing. By coating the smoothed surface with a clear paint, the fishing rod in accordance with this invention can be obtained.

The fishing rod of this invention is generally of the same tapered cylindrical shape as conventional fishing rods, but is characterized by its special wall structure in which the glass cloth 1 having the film 2 of letters, geometrical figures or decorative designs formed on its outer surface is laminated in a plurality of layers (three layers in the drawing) within a matrix of the transparent cured resin 3, as shown in FIG. 6. Since the cured resin in the fishing rod of this invention is transparent, the letters, geometrical figures or decorative designs on the glass cloth of the outermost layer can naturally be viewed from outside. The design pattern on the glass cloth in an inner layer can also be viewed from outside through the outer layer of glass cloth since the glass cloth permits transmission of light. Under violent sunlight in a wide open fishing area, the diffused reflection and the refraction of light in the individual glass cloth layers of fishing rods interact to present an esthetic appearance.

Since according to the method of this invention, a film of a pattern such as letters, geometrical figures or decorative designs is formed directly on the surface of a glass cloth by printing or coating, the operation is simple and efficient when compared with the conventional methods by which printing or coating is performed on the curved surface of fishing rods or on a prepreg having tackiness. Thus, there is no likelihood of the pattern-bearing film being deformed by the melting and flowing of the resin at the time of molding the prepreg, nor does the film impair the adhesion between the layers of the prepreg.

Fishing rods having a complicated pattern such as letters, geometrical figures or decorative designs and a beautiful appearance suited for the taste of fishermen can be provided simply, efficiently and at low costs in accordance with the present invention.

What we claim is:

1. A method for producing a fishing rod made of a glass fiber-reinforced synthetic resin which comprises impregnating a glass cloth with a transparent thermosetting synthetic resin to form a prepreg, wrapping the prepreg about a tapered mandrel, curing it under heat, and then pulling out the mandrel, wherein the glass cloth has letters, geometrical figures or other decorative designs printed directly on the whole of its surface prior to impregnation.

2. The method of claim 1 wherein the letters, geometrical figures, or decorative designs are printed by using a curable printing ink containing a metal chelate crosslinking agent or isocyanate crosslinking agent.

* * * * *